(12) United States Patent
Cousins et al.

(10) Patent No.: US 6,417,797 B1
(45) Date of Patent: Jul. 9, 2002

(54) SYSTEM FOR A MULTI-PURPOSE PORTABLE IMAGING DEVICE AND METHODS FOR USING SAME

(75) Inventors: Robert E. Cousins, Saratoga; Steven A. Shaw, Modesto, both of CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/324,068

(22) Filed: Jun. 1, 1999

Related U.S. Application Data

(60) Provisional application No. 60/092,798, filed on Jul. 14, 1998.

(51) Int. Cl.[7] .......................... G01S 13/89; G01S 13/88
(52) U.S. Cl. ........................... 342/179; 342/24; 342/25; 342/27; 342/52; 342/55; 342/175; 342/176; 342/195
(58) Field of Search ................................ 342/25, 27, 28, 342/175–186, 192–197, 22, 24, 52–56; 367/117, 93, 94, 99, 100–105

(56) References Cited

U.S. PATENT DOCUMENTS

| | | | |
|---|---|---|---|
| 3,383,682 A | * 5/1968 | Stephens Jr. ................. | 342/24 |
| 3,987,403 A | * 10/1976 | Smith ......................... | 367/102 |
| 4,641,317 A | 2/1987 | Fullerton | |
| 4,743,906 A | 5/1988 | Fullerton ..................... | 342/27 |
| 4,791,934 A | 12/1988 | Brunnett | |
| 4,813,057 A | 3/1989 | Fullerton | |
| 4,818,348 A | 4/1989 | Stetter | |
| 4,893,815 A | 1/1990 | Rowan | |
| 4,901,084 A | 2/1990 | Huguenin et al. ........... | 342/179 |
| 4,910,523 A | 3/1990 | Huguenin et al. ........... | 342/179 |
| 4,979,186 A | 12/1990 | Fullerton | |
| 5,047,783 A | 9/1991 | Huguenin et al. ........... | 342/179 |
| 5,073,782 A | 12/1991 | Huguenin et al. ........... | 342/179 |
| 5,140,416 A | 8/1992 | Tinkler | |
| 5,202,692 A | 4/1993 | Huguenin et al. ........... | 342/179 |
| 5,227,800 A | 7/1993 | Huguenin et al. ........... | 342/179 |

(List continued on next page.)

FOREIGN PATENT DOCUMENTS

| | | |
|---|---|---|
| WO | WO 97/27496 | 7/1997 |
| WO | WO 97/27527 | 7/1997 |
| WO | WO 97/41449 | 11/1997 |

OTHER PUBLICATIONS

Clarkson, Mike, and Strome, Murray, "Expert Systems and Image Analysis", 12th Canadian Symposium on Remote Sensing. IEEE No. 89CH2768–0, Library of Congress No. 89–84217, Jul. 10–14, 1989, Vancouver, Canada.

*Primary Examiner*—Bernarr E. Gregory
(74) *Attorney, Agent, or Firm*—Ropbert Platt Bell; Steven A. Shaw; Steven Lin

(57) ABSTRACT

The present invention is a multi-purpose portable imaging device. The device is small enough to be hand-held or wearable and has embedded on its surface at least one sensor. These sensors may be active or passive. Analog energy received from the sensors is converted into a digital format and sent to an advanced computer. The computer is constructed on parallel architecture platform. The computer has the capability of taking data from multiple sensors and providing sensor fusion features. The data is processed and displayed in a graphical format in real time which is viewed on the imaging device. A keypad for entering data and commands is available on the device. The device has the capability of using a removable cartridge embedded with read only memory modules containing application software for manipulating data from the sensors. The application cartridge provides the imaging device with its multi-purpose functionality. Methods of utilizing expert systems to match generated images, or dielectric constants is provided.

32 Claims, 14 Drawing Sheets

U.S. PATENT DOCUMENTS

| | | | |
|---|---|---|---|
| 5,261,404 A | 11/1993 | Mick et al. | |
| 5,274,236 A | 12/1993 | Pascale et al. | |
| 5,274,271 A | 12/1993 | McEwan | |
| 5,291,889 A | 3/1994 | Kenet et al. | |
| 5,337,053 A * | 8/1994 | Dwyer | 342/22 X |
| 5,339,080 A * | 8/1994 | Steinway et al. | 342/22 |
| 5,345,471 A | 9/1994 | McEwan | |
| 5,361,070 A | 11/1994 | McEwan | |
| 5,363,108 A | 11/1994 | Fullerton | 342/27 |
| 5,404,387 A | 4/1995 | Hammond et al. | |
| 5,446,461 A | 8/1995 | Frazier | |
| 5,457,394 A | 10/1995 | McEwan | |
| 5,465,092 A | 11/1995 | Mayes et al. | |
| 5,465,094 A | 11/1995 | McEwan | 324/28 |
| 5,471,162 A | 11/1995 | McEwan | |
| 5,479,120 A | 12/1995 | McEwan | |
| 5,483,963 A | 1/1996 | Butler et al. | |
| 5,495,576 A | 2/1996 | Ritchey | |
| 5,510,800 A | 4/1996 | McEwan | 342/387 |
| 5,512,834 A | 4/1996 | McEwan | |
| 5,517,198 A | 5/1996 | McEwan | 342/89 |
| 5,519,342 A | 5/1996 | McEwan | |
| 5,519,400 A | 5/1996 | McEwan | 342/22 |
| 5,521,600 A | 5/1996 | McEwan | 342/27 |
| 5,523,760 A | 6/1996 | McEwan | 342/89 |
| 5,531,227 A | 7/1996 | Schneider | |
| 5,563,405 A | 10/1996 | Woolaway et al. | |
| 5,563,605 A | 10/1996 | McEwan | 342/202 |
| 5,568,574 A | 10/1996 | Tanguay Jr. et al. | |
| 5,573,012 A | 11/1996 | McEwan | |
| 5,576,627 A | 11/1996 | McEwan | |
| 5,581,256 A | 12/1996 | McEwan | 342/27 |
| 5,589,838 A | 12/1996 | McEwan | 342/387 |
| 5,590,658 A | 1/1997 | Chiang et al. | |
| 5,609,059 A | 3/1997 | McEwan | |
| 5,610,611 A | 3/1997 | McEwan | 342/89 |
| 5,625,836 A | 4/1997 | Barker et al. | |
| 5,644,314 A | 7/1997 | Ahmad et al. | |
| 5,668,555 A | 9/1997 | Starr | 342/179 |
| 5,675,149 A | 10/1997 | Wood et al. | |
| 5,677,927 A | 10/1997 | Fullerton | |
| 5,687,169 A | 11/1997 | Fullerton | |
| 5,690,114 A | 11/1997 | Chiang et al. | |
| 5,707,879 A | 1/1998 | Reinitz | |
| 5,760,397 A | 6/1998 | Huguenin et al. | |
| 5,764,696 A | 6/1998 | Fullerton | |
| 5,767,842 A | 6/1998 | Korth | |
| 5,812,081 A | 9/1998 | Fullerton | 342/21 |
| 5,815,113 A | 9/1998 | Lo et al. | 342/351 |
| 5,818,381 A * | 10/1998 | Williams | 342/24 |
| 5,819,859 A | 10/1998 | Stump et al. | |
| 5,832,035 A | 11/1998 | Fullerton | |
| 5,835,054 A * | 11/1998 | Warhus et al. | 342/22 |
| 5,839,441 A | 11/1998 | Steinberg | |
| 5,877,803 A | 3/1999 | Wee et al. | |
| 5,883,591 A | 3/1999 | McEwan | 342/22 |
| 5,886,664 A | 3/1999 | Yujiri et al. | 342/351 |
| 5,900,833 A * | 5/1999 | Sunlin et al. | 342/22 |
| 6,130,641 A * | 10/2000 | Kraeutner et al. | 342/179 |
| 6,222,481 B1 * | 4/2001 | Abrahamson et al. | 342/22 X |

* cited by examiner

SYSTEM FOR A MULTI-PURPOSE PORTABLE IMAGING DEVICE AND METHODS FOR USING SAME

CROSS-REFERENCE TO RELATED APPLICATIONS

This application claims priority from Provisional U.S. patent application Ser. No. 60/092,798, filed Jul. 14, 1998, and incorporated herein by reference. This application is related to "System and Method for Enhancing Dynamic Range in Images" U.S. patent application Ser. No. 08/856,468, incorporated herein by reference filed May 14, 1997, now U.S. Pat. No. 6,137,533, U.S. patent application Ser. No. 09/525,528 "System and Methods for Floating Point Pipelines", filed Mar. 15, 2000.

FIELD OF THE INVENTION

This invention relates generally to a multi-purpose portable imaging device, and more particularly to a device for displaying images from sensors embedded in a hand-held device, which performs various specialized functions which may be determined by hardware and software components.

BACKGROUND OF THE INVENTION

Algorithms for processing digital images are well known and are presented in such literature as Digital Image Processing, by Rafael G. Gonzalez and Richard Woods, Addison-Wesley Publishing Company, Inc., 1992, herein incorporated by reference. The book gives examples for image acquisition, storage, processing, communication, and display.

Specialized devices for collecting, processing, and displaying data have been developed for various applications. Examples of electromagnetic spectrum devices which are well known in the art are radar systems, x-ray systems, magnetic resonance imaging (MRI) systems, and infrared (IR) systems. An example of a well-known device using sound waves is an ultrasound system. An example of a well-known device for use in water is sonar. Another example is an airport security baggage x-ray device. Most of these devices have the disadvantages of being costly, occupying a large physical space, consuming large amounts of power, and being limited to performing a single, dedicated task.

An example of a X-ray device for imaging is described in U.S. Pat. No. 5,181,234 entitled, "X-Ray Backscatter Detection System", issued to Smith on Jan. 19, 1993, and incorporated herein by reference. It discloses an x-ray scanner for the human body to detect hidden weapons. The commercial implementation of the invention is the SECURE 1000 from Rapiscan Security Products, Inc. with a list price of $110, 000.

Because of advances in miniaturization and cost-reduction in the semiconductor art, certain devices for collecting, processing, and displaying data have become small enough to be portable or wearable. These compact devices typically comprise sensors for collecting data, a processor for manipulating data, and a graphical display for showing real-time information.

For example, in the radar art U.S. Pat. No. 4,641,317 entitled "Spread Spectrum Radio Transmission System," issued to Larry Fullerton on Feb. 3, 1987, and incorporated herein by reference, discloses a communication system which uses an intelligence signal to modulate the spacing of narrow pulses of radio transmission which is essentially non-interfering. Additionally, U.S. Pat. No. 5,668,555 entitled, "Imaging System and Apparatus," issued to Starr on Sep. 16, 1997, and incorporated herein by reference, discloses a low-cost, portable radar system. The '555 patent is based upon the advance in the field of miniaturization of radar circuits as disclosed in U.S. Pat. No. 5,361,070 entitled, "Ultra-Short Pulse Generator," issued to McEwan on Dec. 28, 1993, incorporated herein by reference, which discloses a radar on a chip. The '555 patent receives radar data which is in turn loaded into a "CAD" (Computer Aided Design) program, which in turn generates a computer image from the radar data. However, such a system, using CAD technology, would not generate images in real time in a portable device, as the amount of processing power required to render images in CAD format is considerable.

An example is the visible art is U.S. Pat. No. 5,712,682. incorporated herein by reference entitled, "Camera having an Adaptive Gain Control," issued to Hannah on Jan. 27, 1998, which discloses an imager with gain control signal for adjusting the level of gain applied by an amplifier to a digital output signal.

Another example in the infrared art is U.S. Pat. No. 5,675,149 entitled, "Compact Thermal Camera", issued to Wood et al. on Oct. 7, 1997, which discloses a low-cost, hand-held infrared camera.

An example of radiation detection is provided by U.S. Pat. No. 5,707,879 entitled, "Neutron Detector Based on Semiconductor Materials," issued to Karl Reinitz on Jan. 13, 1998, which discloses a radiation detector on a semiconductor chip.

The current generation of imaging devices has three major disadvantages. First, the current generation of imaging devices has the disadvantage of being large and costly requiring external power to operate. Second, the current generation of imaging devices has the disadvantage of being limited to only one kind of sensor, such as radar, CCD, Infrared and the like. This limitation is determined by the lack of adequate processing power of the computer technology that is available, which makes it impractical in a portable device to process data from more than one kind of sensor. For example, using current technology is not feasible to combine an IR sensor with a radar sensor into one compact device. Combining data from multiple sensors is known in the art as sensor fusion. Third, the current generation of imaging devices has the disadvantage limited to performing only one task, such as radar imaging for blood flow visualization. Using the previous example, if instead of blood flow visualization, radar imaging for tissue analysis is desired, another device must be constructed.

Although the prior art teaches about ways to accomplish sensor fusion, the improvements are limited to large devices. Information on sensor fusion can be found in literature such as Multi-Sensor Fusion, by Richard R. Brooks and S. S. Iyengar, Prentice Hall, 1998 at www.phptr.com incorporated herein by reference. An example of sensor fusion is provided by U.S. Pat. No. 5,274,236 entitled, "Method and Apparatus for Registering Two Images from Different Sensors," issued to Pascale et al. on Dec. 28, 1993, and incorporated herein by reference. The '236 patent discloses an invention that improves delivery of a missile to a target by fusing data from an infrared sensor on an aircraft with data from a forward-looking infrared sensor on a guided missile. U.S. Pat. No. 5,531,227 entitled, "Imaging Device and Method," issued the Schneider on July 2, 1996, shows the use of different mechanisms to obtain an image by using image libraries and is incorporated herein by reference.

Addressing the disadvantage of being limited to only one task, an object of one embodiment of the present invention is to provide a means for easily changing the software of the invention so that the same device may be used for a different application. To this end, the invention has a means for receiving a cartridge with memory modules, or other storage media containing software. For example, one cartridge may contain software for use in medical imaging while another cartridge may contain software for use in traffic accident investigations. These cartridges process the data from some or all of the sensors on the device, but manipulate the data for a specialized result such as customized display with highlights. The present invention maximizes value by leaving the hardware of the compact imaging device essentially unchanged, while simultaneously allowing the function of the invention to change by replacing a software cartridge.

Addressing the disadvantage of being limited to only one kind of sensor, it is an object of an embodiment of the present invention to provide information from a variety of sensors to a graphical display on a portable device. These sensors comprise, but are not limited to radar transmitters and receivers, lasers, receivers of various electromagnetic spectrum such as Infrared or ultra-violet, CCD cameras, and navigational/position technologies such as Global Positioning System (GPS).

An example of 3D detection of an object within a static image using CCD cameras is provided by U.S. Pat. No. 5,877,803 entitled, "3-D Image Detector," issued to Wee et al on Mar. 2, 1999, and incorporated herein by reference. Wee uses multiple CCD cameras to obtain data representing the magnitude of light impinging upon objects in a field of view. Triangulation algorithms commonly known in the mathematical art are then applied to the data to derive surface depth and contour information.

The present invention may be implemented utilizing a low power broadband radar such as the Micro-power Impulse Radar (MIR) technology developed by Lawrence Livermore National Laboratories. Examples of such MIR applications may be found in U.S. Pat. Nos. 5,457,394, 5,465,094, 5,479,120, 5,510,800, 5,512,834, 5,519,400, 5,521,600, 5,581,256, 5,589,838, 5,609,059, and 5,610,611, incorporated herein by reference. The MIR devices comprises small, low power, broadband radar devices which are being developed for a wide range of applications. These radar devices are coupled to antenna arrays and a processor to form a complete radar imaging system. Hardware and software is used to reconstruct 2D and 3D views of the scene.

Due to their low cost and size, numerous MIR sensors may be assembled into arrays for synthetic and real aperture image formation in 2-D and 3-D. Radar return signals are digitized and stored in a lap-top computer. Reconstruction of cross-sectional images from B-scan or waterfall type data is performed by diffraction topography software on the lap-top. Images of the scene are displayed directly on a screen within ten seconds (in 2-D). However, such slow imaging response times may be unacceptable for many applications, and moreover limit the overall usefulness of MIR technology.

For example, if such images could be processed in real-time, an animated image may be produced. Such animated images may have many applications. For example, an animated image (real-time image) may allow a doctor to view blood flow through a patient or other internal workings, rather than a static image.

For portable applications, an imager may be "swept" through an area and the user may view—in real time—the corresponding image. Thus, for example, such an imager may be used to find underground objects (e.g., pipes, ducts, wiring, and the like) by sweeping such a device over a particular area and viewing the resultant image. However, such applications require near real-time processing of sensor data.

Such improvements in the art may be made possible by the exceptional processing power inherent in using an integrated processor array. An integrated processor array is an innovation in computer technology which provides fast and inexpensive computer power in a compact space and is further described below.

SUMMARY OF THE INVENTION

The present invention is a multi-purpose portable imaging device. The device is small enough to be hand-held or wearable and has embedded on its surface at least one sensor. These sensors may be active or passive. Analog energy received from the sensors is converted into a digital format and sent to an advanced computer.

The computer is constructed on a parallel array platform such as shown in U.S. Pat. No. 5,625,836 Barker et al., incorporated herein by reference. The computer has the capability of taking data from multiple sensors and providing sensor fusion features. The data is processed and displayed in a graphical format in real time which is viewed on the imaging device. A keypad, or touch screen, or other entry device for entering data and commands may be available on the device. The device has the capability of using a removable cartridge embedded with memory modules containing application software for manipulating data from the sensors and RAM or peripherals such as GPS units. The data may also be uploaded to other computers.

DETAILED DESCRIPTION OF THE INVENTION

Figure 1:
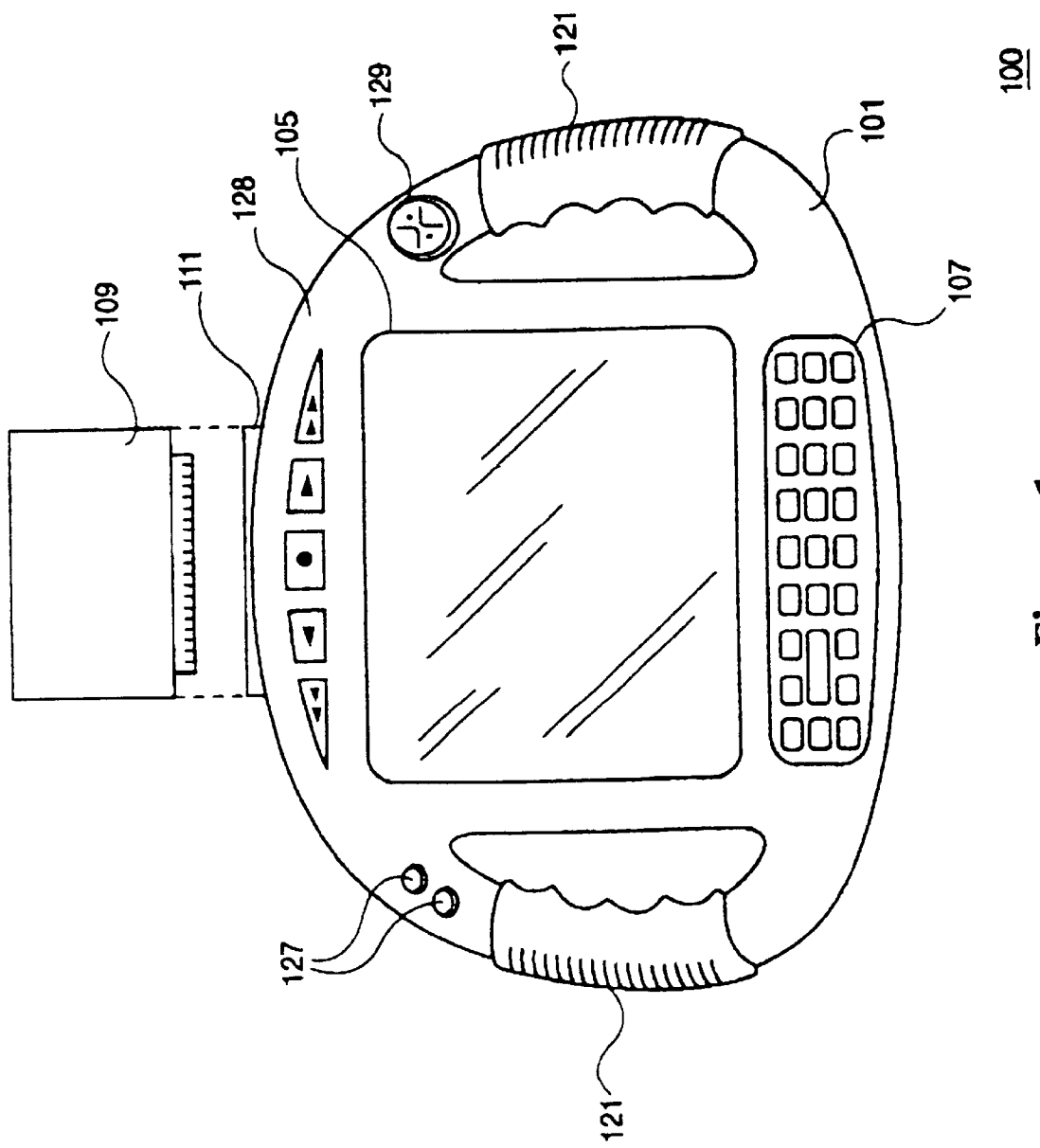
FIG. 1 is a top view of one embodiment of the present invention illustrating a portable multi-purpose imaging device.
Figure 2:
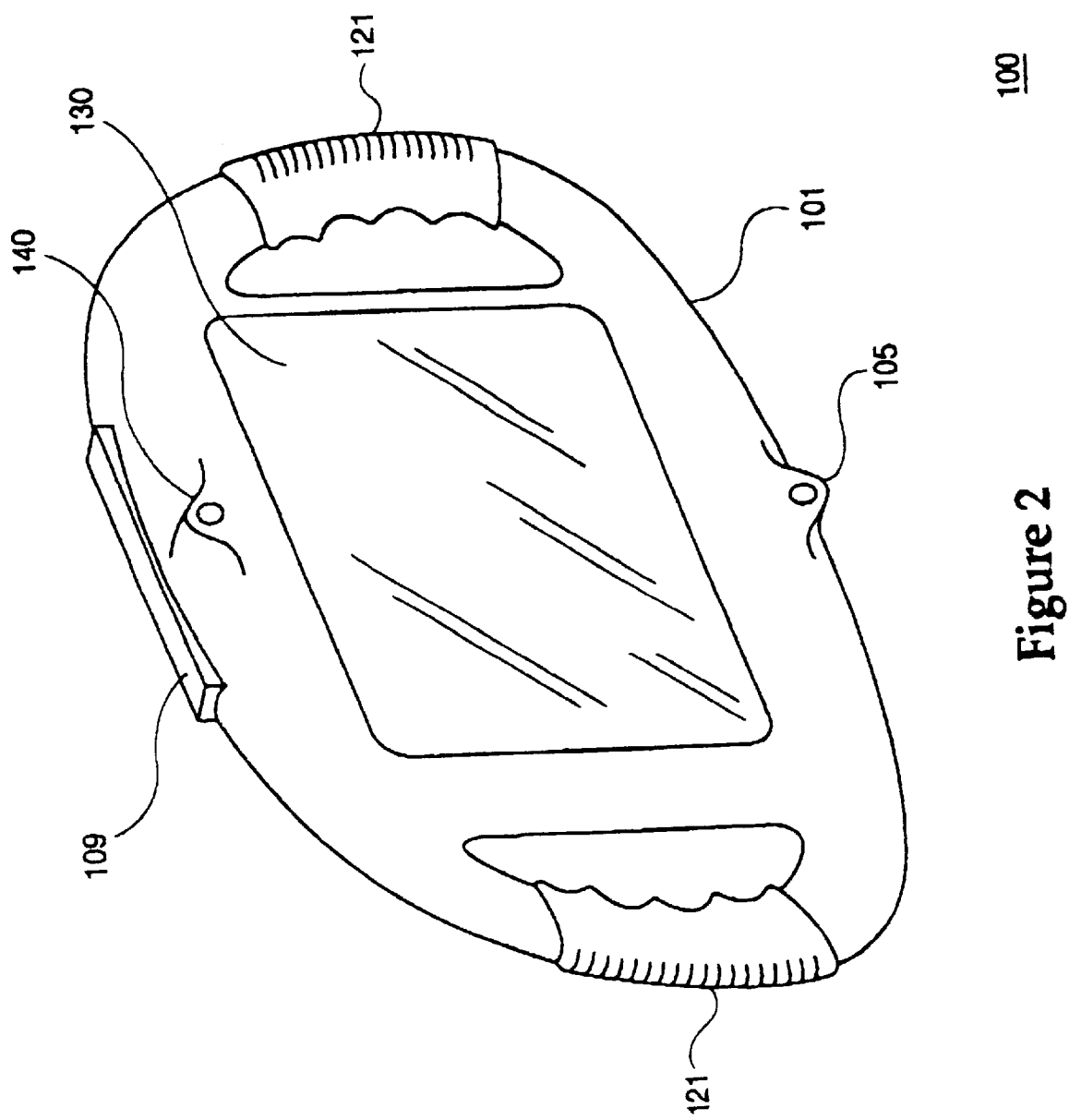
FIG. 2 is a perspective view of a bottom portion of the embodiment of FIG. 1 illustrating the sensor array.

FIG. 1 is a top view of one embodiment of the present invention illustrating a portable multi-purpose imaging device 100. FIG. 2 is a perspective view of a bottom portion of the embodiment of FIG. 1 illustrating the sensor array. The sensors in the array could be of different types to detected different energies. Imaging device 100 comprises a compact, hard case 101 designed for hand-held use using handles 121. Hard case 101 also serves as the platform for the components of imaging device 100.

As illustrated in FIG. 1, imaging device 100 may include a display 105, a keypad 107, an applications cartridge 109, and a plurality of cartridge slots 111. Display 105 may comprise an active or passive matrix flat panel display or the like such as that known in the computer art. The display may also be a holographic display such as will be described later. Keypad 107 may comprise a membrane switch type keypad or keyboard. In addition, as illustrated in FIG. 1, other types of buttons and switches may be provided such as selector buttons 127, scanning buttons 128 and joystick control pad 129. Additionally, interfaces to other imaging devices may also be provided to provide sharing of imaging data among other imaging devices or to transmit imaging data to remote locations using ground-base wireless or satellite technology. An interface for 3D goggles and other display devices may also be provided. Such 3D goggles are available which provide an image to each eye and darkens each lens at a frequency tied to the imaging device so that the wearer perceives a 3D image. Another technique for presenting a 3D image is the Virtual Retinal Display (VRD) available from Microvision (Seattle, Wash.) and are described in U.S. Pat. Nos. 5,659,327 and 5,467,104 herein incorporated by reference.

Another type of display is a holographic autostereoscopic display. This type of display is described in PCT Patent Application Serial No. PCT/GB96/03014 and the paper "Direct View Holographic Autostereoscopic Displays," from Brunel University at www.BRUNEL.AC.UK. The user of this type of display can see a stereoscopic 3D image in front and behind the plane of the screen without the need for any special glasses. Therefore, a doctor can see a virtual image of the interior of a patient during an operation. As will be described later, imaging device is capable of sorting different materials based on dielectric constant and the materials effluence on the sensor's or array's directed energy. This will allow for more expansive use of minimally invasive surgical techniques.

Keypad 107 may be used to input data and select operating parameters. Data may be input to label particular scans with relevant data (patient name, location, or the like). Operating parameters such as contrast, focus, brightness, as well as scan type may be selected using keypad 107, selector buttons 127, scanning buttons 128 and/or joystick control pad 129. It may be appreciated that other types of input devices (trackball, touchpad, voice or handwriting recognition or the like) may also be applied as input devices. Since the imaging device can image bones and other tissues, hand signals and lip movements may also be used to interface with the device by a person who may be scanned. The device can interpret sign language or read lips. This will also allow for the operator and the person scanned to be the same person.

In operation, a graphical user interface (GUI) may be employed to allow a user to select image type, scan type and the like. Joystick control pad 129 or scanning buttons 128 may be used to scroll or scan to different portions of an image. Similarly, a window may be clicked on to perform the same or similar functions, including reduce and enlarge functions.

One or more Cartridge slots 111 may be provided to accept external cartridge 109. Cartridge 109 may comprise, for example, a PCMCIA card or other type cartridge known in the art. Such cartridges may be used to expand the capabilities of Imaging device 100 or specialize imaging device 100 for particular applications. Imaging device 100 may thus be constructed as a generic device, with specialized applications cartridges provided to allow imaging device 100 to be adapted to particular applications such as medical, construction, archeology, geology, forensic, or personal use.

For medical applications, cartridge 109 may program imaging device 100 to generate images of human tissue and bone, with suitable coloration and textures applied to distinguish different areas of relative density. Multiple cartridges can be used to provide additional functionality. For example, a medical imaging cartridge can be used in conjunction with a cartridge providing utilities for finding a bullet or locating a fracture.

For other applications such as construction, geology, and archeology, cartridge 109 may program imaging device 100 to generate images depicting underground features, such as geologic strata, buried objects (pipes, relics, and the like) or other features.

In an forensic embodiment or law enforcement, infrared data may be recorded, including heat signatures which may indicate the presence of a suspect, or the intensity of recent skid marks, engine temperature (indicating how long a car has sat idle) and the like. Skeletal structure data may also be used to identify a criminal suspect even if the suspect has his face hidden. Heat signature and bone structure may also be used to lock and track a fleeing suspect.

In the field of airport security, a person can be scanned for weapons. At security checkpoints many times a person must be scanned with a metal detector. The metal detector responds to all metals such as hip replacements and metal plates in skulls. An imaging device of the present invention can image the metal to determine if it is a weapon or just medical material.

In all embodiments, image data may be stored in digital form for later playback on imaging device 100 or in another device such as a computer system or the like. Image data may be stored in a hard disk drive, flash memory, or the like. Storage devices may be provided as additional cartridge devices, and additional cartridge slots 111 may be provided for such storage devices. Such storage devices (hard drives, flash memory) are conventionally available as PCMCIA devices.

The imaging apparatus of the present invention may be used to "scan" an area to quickly produce a representational and accurate 3-D map. Motion compensation technology, combined with inertial and/or satellite sensor technology, may allow such a handheld device to "scan" over a predetermined area (accident scene, construction site, or the like) to produce a larger 3-D image or map.

As an image "moves" on display 105 during a scan, motion compensation algorithms detect such motion and convert such motion into position data. From a particular scan or number of scans, an overall 3-D image map of an area may be assembled. Additional data may be created by having multiple imaging devices communication with each other through an interface. Radar technology may provide distance data which in turn may be correlated with image data produced by camera 140. From such a 3-D map, a virtual 3-D display of a scanned area may be generated. Thus, after an area has been scanned, it may be later revisited virtually and viewed from angles and modes not originally viewed in the original scan.

Embedded in the underside of hard case 101 is a sensor array 130 which may be covered with a suitable impedance matched cover or the like so as not to attenuate transducer signals. In the preferred embodiment, sensor array 130 may comprise a phased array of radar transducers or the like. In alternative embodiments, other types of sensors may be utilized within the spirit and scope of the present invention.

Although the sensor may include CCD devices a CCD Camera 140 may also be provided, as a charge-coupled device (CCD) camera known in the art, or as an infrared or low-light camera, or a combination of types sensitive to different parts of the electromagnetic spectrum. Examples of such cameras are part numbers CS7615 or CS7665 available from Cirrus Logic, Inc. which include per-pixel gain control and selection circuitry. This circuitry is described in co-pending U.S. patent application Ser. No. 08/856,468, "System and Method for Enhancing Dynamic Range in Images," filed May 14, 1997, now U.S. Pat. No. 6,137,533, applied for by S. Khalid Azim assigned to Cirrus Logic, Inc. and is herein incorporated by reference. This circuitry allows for bright areas to be eliminated such as in the welding arts. You can see the materials and the site of the weld at a constant brightness without camera wash out. Camera 140 may generate a visual image of an area scanned by sensor array 130 and/or may provide thermal imaging or night visioning capabilities. Such images may be combined, compared, or superimposed with image data generated from sensors 130. An opening 105 may also be provided for optional functions in different embodiments one option is a laser to illuminate an object and provide additional sensor data.

In another embodiment, opening 105 may provide for an ink jet emitter such as is shown in U.S. Pat. No. 5,877,786 issued to Sekyia et al. On Mar. 2, 1999, assigned to Ricoh Company, Ltd and its cited art. This embodiment is useful for example in the construction trades. The imager can show studs hidden by drywall or other materials. The ink jet emitter is used to mark the locations of various items while scanning. Selector buttons 127 may be used to activate the ink jet emitter.

The sensor array and CCD camera may also be incorporated in a helmet or bridge of 3D goggles or VRD devices. The imaging electronics, batteries, and cartridge slots may be located in another unit wore on the belt or the back of the user.

The CCD camera would also provide for eye-protection which will allow a user to see a complete image in high-contrast situations. For example, a pilot can fly without danger eyesight damage from directed energy weapons such as lasers. Another example in welding, good visibility of object being welded is required, but the welders eyes must be protected from the brightness of the welding area during the welding process. The radar functions may provide for welding around blockages or inside materials by robotic welders.

Although the preferred embodiment is a portable device, A sensor array may also be incorporated into an operating table or emergency medical vehicle providing important information to doctors and other medical personnel.

The device may be designed with limited features, thus making cost the advantage. Another embodiment of the present invention may be a specifically designed and pro-grammed device to perform just one job. An example is imaging devices cheap and rugged enough to be incorporated into streetlights and doorways. These devices can be designed to alert authorities of persons armed with weapons or fitting a biometric pattern. By using multiple devices, the authorities can track their direction. The inexpensive dedicated devices may make airports more secure by having hidden checkpoints which will detect weapons which a terrorist may have been able to get through the known security checkpoint. Due to its portability, security personnel may roam the airport and check baggage and persons away from the checkpoints.

Figure 3:
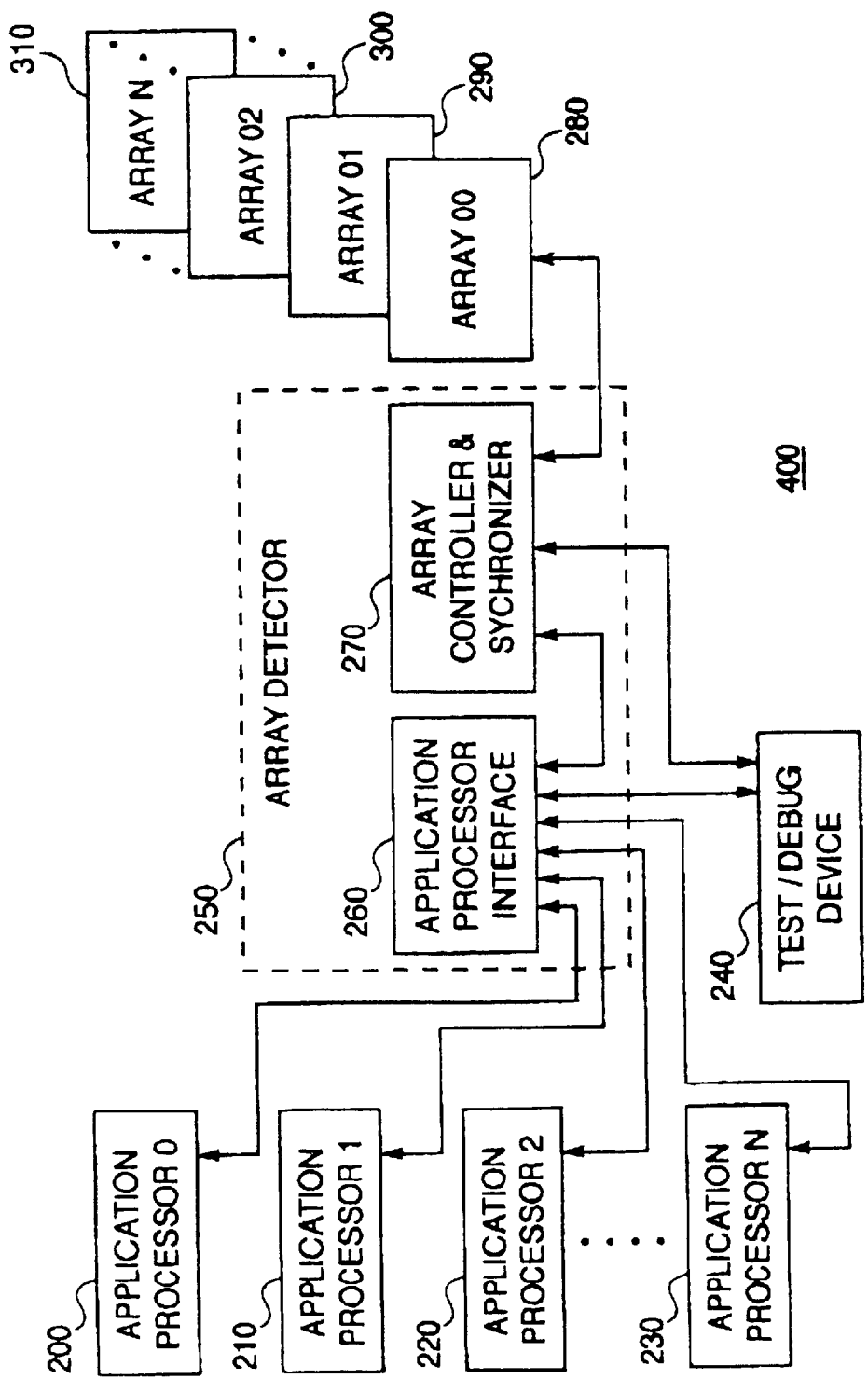
FIG. 3 is a block diagram showing the general components of an integrated processor array.

FIG. 3 is a block diagram showing the general components of a parallel array computer architecture. As the name implies, a parallel array architecture is designed to provide an integrated computer subsystem using a new architecture providing significant benefits in computer applications by integrating a number of processor in parallel. Such a parallel array processor package is described, for example, in Dapp et al., U.S. Pat. No. 5,734,921, issued Mar. 31, 1998 and incorporated herein by reference.

FIG. 3 illustrates the basic building blocks which may be configured into different system block diagrams in the array processor package of Dapp. Processor array 400, in a maximum configuration, may incorporate 32,768 identical processor memory elements (PMEs). Processor array 400 may comprise PME Arrays 280, 290, 300, and 310, an Array Director 250 and an Application Processor Interface 260 for the application processor 200 or processors 210, 220, 230.

Array Director 250 may comprise three functional units: Application Processor Interface 260, cluster Synchronizer 270 and cluster Controller 270. Array Director 250 may perform the functions of an array controller as in prior art linear picket System for single instruction multiple data (SIMD) operations with multiple instruction multiple data (MIMD) capability.

Cluster controller 270, along with a set of 64 Array clusters 280, 290, 300, and 310, (i.e. cluster of 512 PMEs), is the basic building block of processor array 400 computer system. The elements of Array Director 250 permit configuring systems with a wide range of cluster replications. This modularity based upon strict replication of both processing and control elements is unique to this massively parallel computer system. In addition, the Application Processor Interface 260 supports the Test/Debug device 240 which will accomplish important design, debug, and monitoring functions.

Controllers may be assembled with a well-defined interface such as the IBM Microchannel, used in other systems today, including controllers with i860 processors. Field programmable gate arrays add functions to the controller which may be changed to meet a particular configuration's requirements (how many PMEs there are, their couplings, and the like).

PME arrays 280, 290, 300, and 310 contain the functions needed to operate as either SIMD or MIMD devices. They also contain functions which permit a complete set of PMEs to be divided into 1 to 256 distinct subsets. When divided into subsets, Array Director 250 interleaves between subsets. The sequence of the interleave process and the amount of control exercised over each subset is program controlled.

Figure 4:
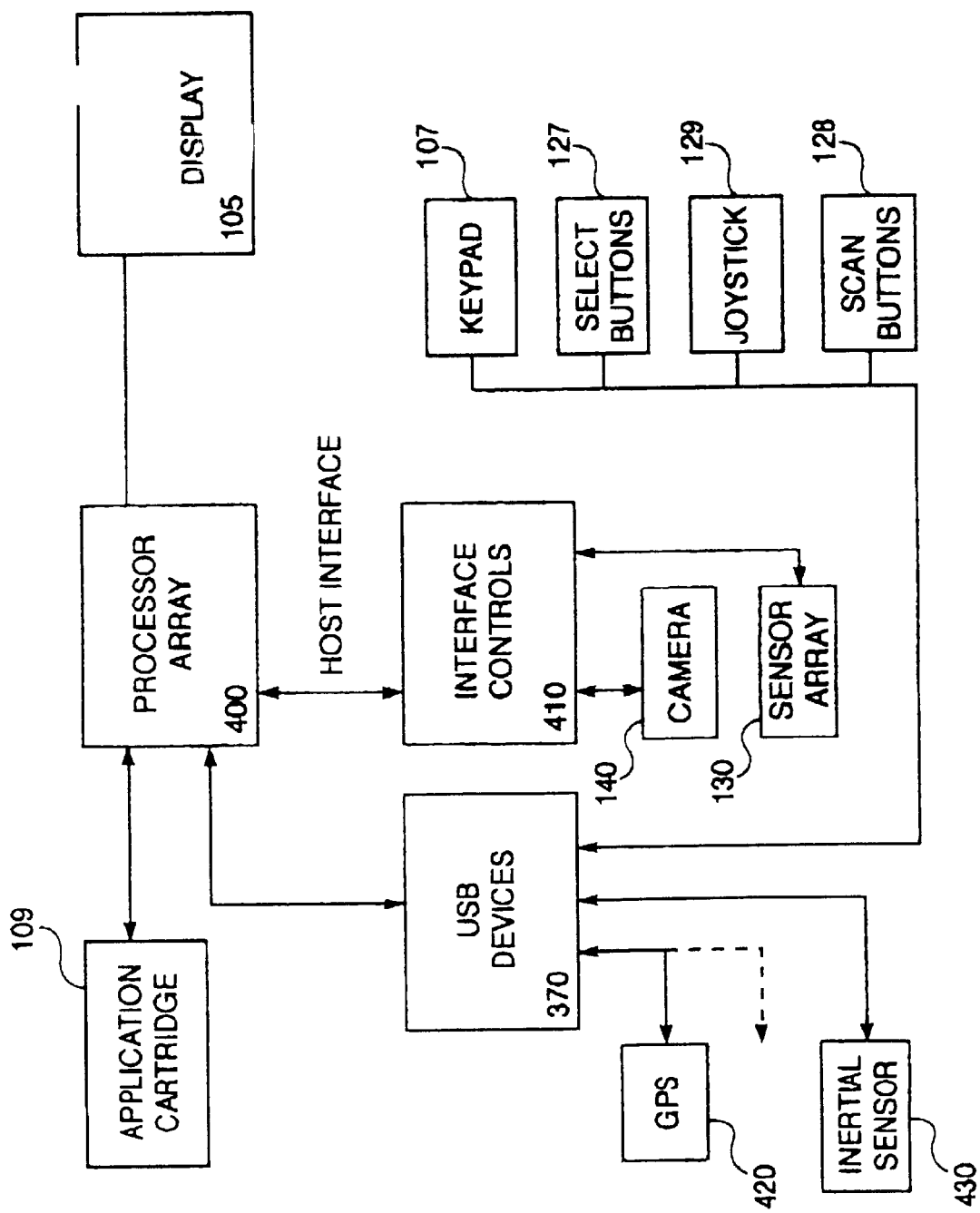
FIG. 4 is a block diagram showing the major components of a system for a multi-purpose portable imaging device.

FIG. 4 is a block diagram showing the major components of a system for a multi-purpose portable imaging device. A plurality of input devices may be provided to input data through USB interface 370 to processor array 400. Such input devices may include global positioning system 420, inertial sensor 430, keypad 107, select buttons 127, joystick 129, and scan buttons 128. Note that while illustrated as being provided with keypad and other user controls, a touch-screen type display may be utilized in the present invention for user input without departing from the spirit and scope of the present invention.

Interface control 410 may interface with processor array 400 through the host interface. Such an interface control may interface with the primary sensors of the apparatus, including radar sensor array 130 and camera and/or IR camera 140. Note that in addition to, or as a compliment to, radar sensor array 130, a sonar or ultrasonic sensor array may also be provided.

Application cartridge 109 may be provided which may include, for example, a read only memory (ROM) providing program control functions for the device to customize the device for a particular function. Note that although only one such cartridge is illustrated, a number of such cartridges and corresponding slots may be provided to allow a multiple number of cartridges to be inserted at once. In addition, cartridge 109 may interface through USB devices 370 and/or through the host interface. In the latter case, application cartridge 109 may include, for example, a host processor or the like.

Processor array 400 may also be coupled to flat panel display 105 through a video output controller. Processor array 400, being a highly parallel architecture, is well suited to applications such as video processing, where a limited number of processing steps may be performed simultaneously on a large amount of data.

Operation of the device may vary depending upon application. In one embodiment, a program cartridge 109 may instruct processor array 400 to scan an area to produce and store a 3-D image map of an area. In such an embodiment, a user may scan over an area by moving the apparatus so as to cover areas of interest. For example, a user may wish to scan a building or site to produce accurate 3-D architectural or geographical data of that area. Multiple scans can be used to get an image requiring more or redundant data for a more accurate image.

As the scan rate of the MIR system may be on the order of more than 100,000 scans per minute, movement of the portable device by the user is immaterial to the scan. As the device is moved, processor array 400 may compare image data with that from a previous scan. As the sample rate is constant, comparison of two successive images may be used to determine the movement of the portable unit. Successive images may thus be appended to one another and moreover movement of the portable device accurately determined.

Once an area has been scanned, a three-dimensional map of the area may be produced. Such three-dimensional data may then be exported to a conventional CAD type system to produce accurate architectural or geographical drawings of a structure or area. As the MIR radar has the ability to "see" through structures, underground or hidden objects may be accurately mapped with the system.

In medical applications, the portable device may scan a patient or portion of a patient and produce an image in real time. Such an image, in real time, may illustrate animated movements of a patient, such as joint flexure, heart movement, blood flow, and the like. By tuning the response of the MIR system, different elements of physiology (e.g., bone, muscle, tendon) may be selectively viewed.

The real-time imaging of the present invention allows a doctor to check a patient internally in real-time without resorting to time-consuming and expensive non-real-time prior art techniques such as MRI and equivalents. The imaging can take place anywhere. The health of various organs, such as lungs, heart, and the like, may be readily determined during a routine office visit simply by viewing the display. In addition, scanned data may be stored to produce a 3-D image map, as noted above for architectural applications. Such a map may then later be retrieved and virtually viewed from any pre-selected angle, allowing a doctor to explore a patient internally even after the patient has left the office.

Patient images may be stored for retrieval at a later time, and even transferred to remote locations. If a doctor decides a second opinion is needed, or a specialist is desired, the patients three-dimensional image may be transferred to the appropriate doctor. The stored information can also be used as a historical database allowing for on-going analysis. The images over time can be compared to determine, for example if a bone is healing properly or if the patient's prostate is enlarging.

Remote scanning and transmission of images may be use to provide real-time information to a physician while the patient is in transport. Remote scanning may also be used for remote surgery. The doctor can view a virtual image of a patient and can manipulate robotic surgical instruments such as those provided by Computer Motion, Inc. (Santa Barbara, Calif.).

Medical care facilities may become more efficient by allowing imaging device 100 operators to scan patients and store the images. Doctors may then diagnose patients by retrieving patient images from anywhere, and at anytime, without having to be in the same room as the patient. Preliminary diagnosis may also be done through expert systems which match patients images, and dielectric constants described below, to identify abnormalities.

Figure 5:
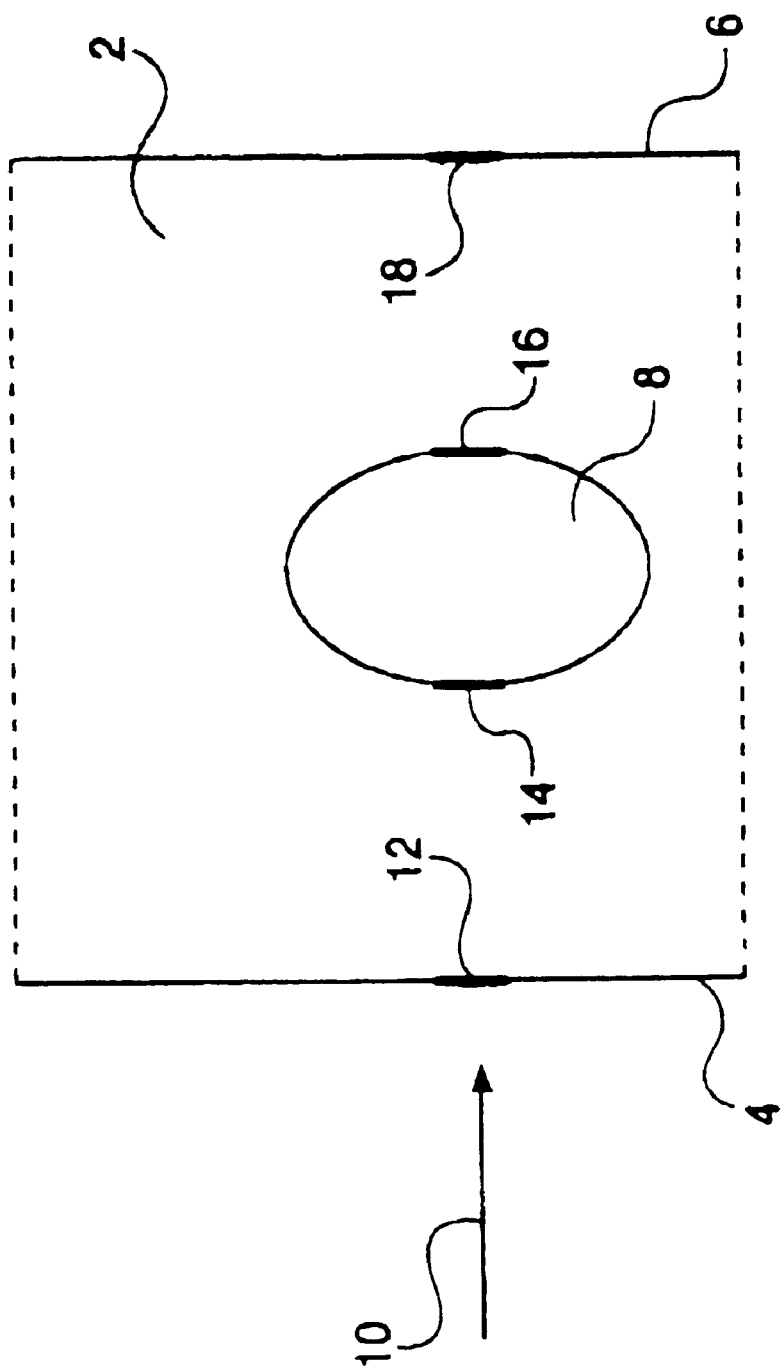
FIG. 5 is an illustrative cross-section of a human body.

FIG. 5 is an illustrative section of human body 2. Human body 2 is shown with front stomach wall 4 and back wall 6. Organ 8, within human body 2, may be scanned by image device 100. Radio wave 10 moves through the air with little or no resistance as radio wave 10 approaches human body 2.

The first point of contact for radio wave 10 may be human body 2 at point of contact 12. A reflection is generated from point of contact 12. As radio wave 10 moves further into human body 2 a reflection is generated from point of contact 14 of organ 8. Another reflection is generated from point of contact 16 of organ 8, and from point of contact 18 of human body 2, as radio wave 10 progresses through.

Reflections, or echoes, are used to determine the scanned objects material. A dielectric constant may be obtained with the following assumptions. Energy at the point of contact may be calculated as a function of distance. The dielectric constant of air is known within 10% even with fluctuations in temperature and humidity. The response waveform's strength may be estimated as energy at the point in time that radio wave 10 hit a point of contact.

Dielectric constant may be calculated as a difference in impedance (Z1−Z2) divided by the sum of impedance (Z1+Z2), squared:

Energy reflected back is calculated as the energy at contact point 12 multiplied by the above equation. This equation renders an estimate of the dielectric constant of the material. Different materials have distinct dielectric constants, such that copper will be distinguishable from a bag of salt, from a liver etc.

Figure 6:
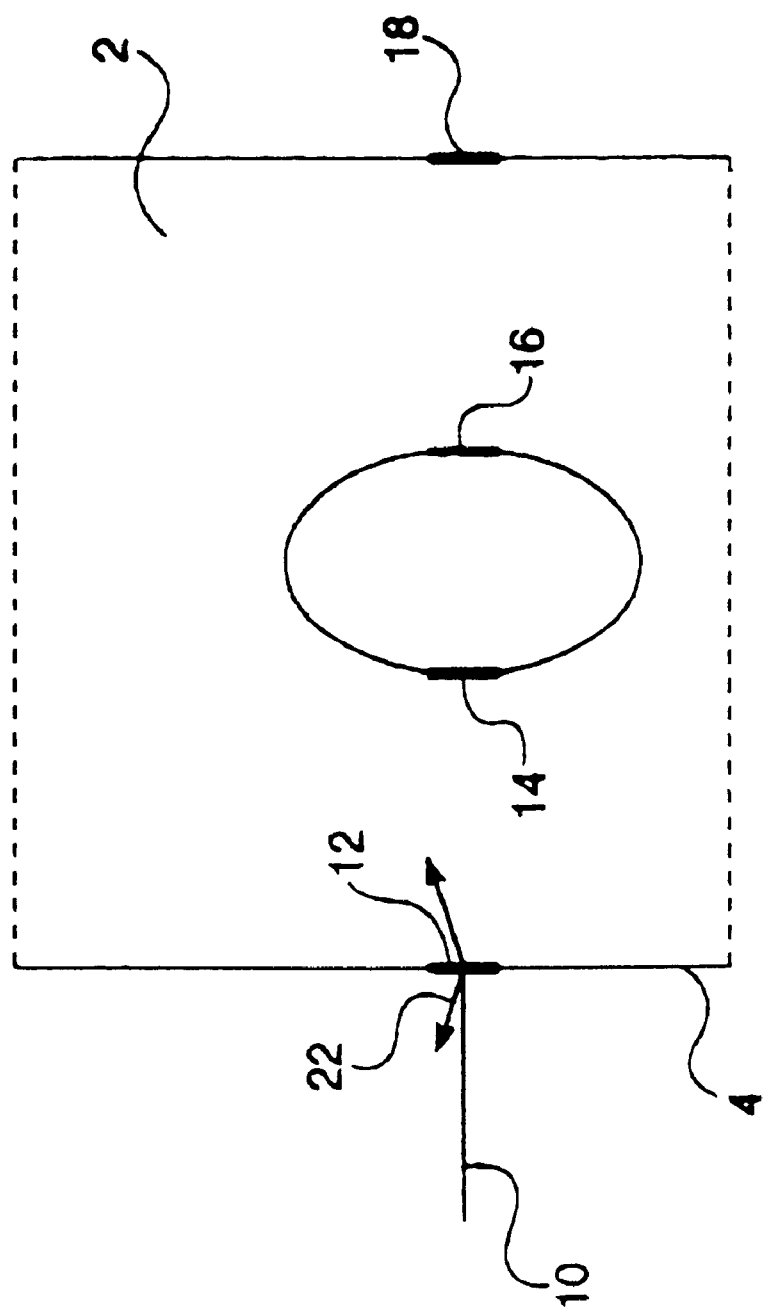
FIG. 6 is a diagram illustrating a radio wave penetrating a human body.

FIG. 6 illustrates radio wave 10 penetrating human body 2. Energy reflected back 22 from contact point 12 is used to determine the dielectric constant of the first substance contacted, front stomach wall 4. Since a portion of radio wave 10 is reflected back 22 and a portion continues through 12, less energy will pass on through human body 2.

Figure 7:
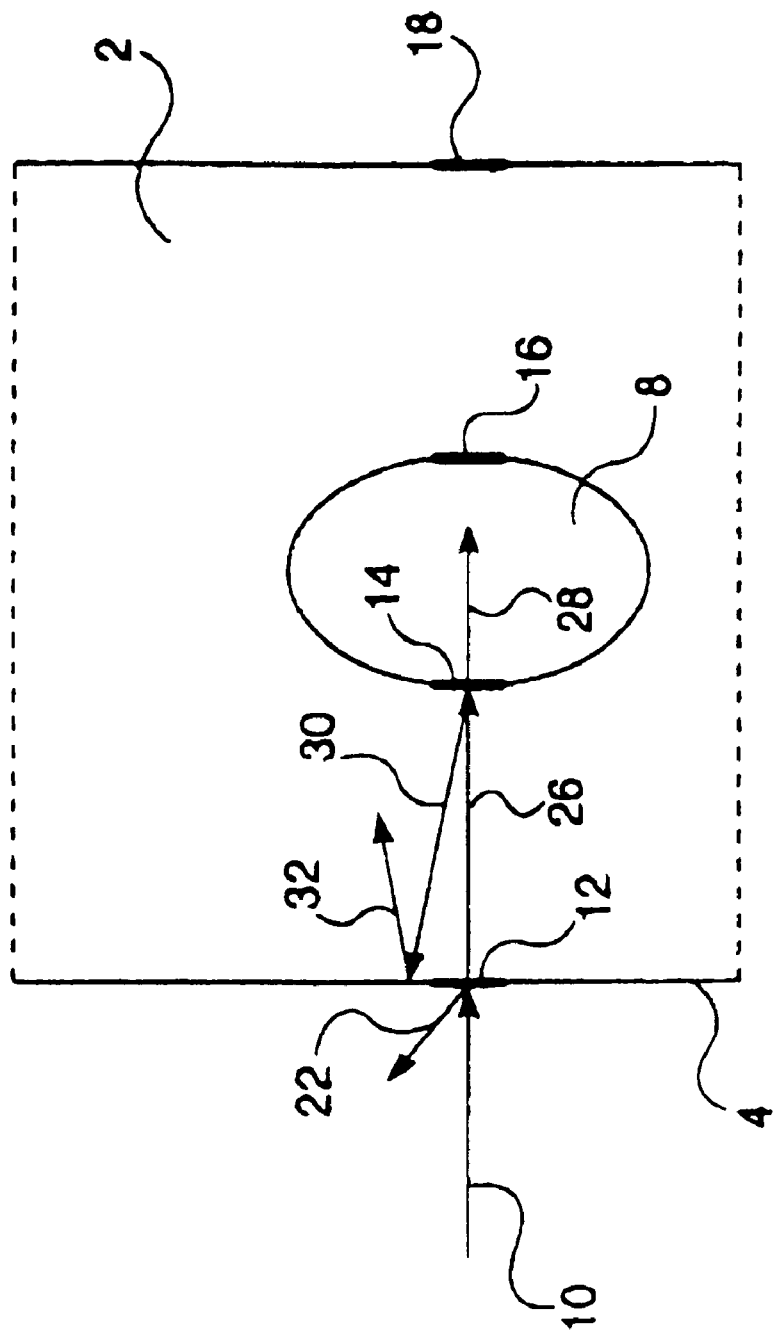
FIG. 7 is a diagram illustrating a radio wave propagating within a human body.

FIG. 7 illustrates radio wave 10 propagating within human body 2. After radio wave 10 passes through contact point 12, energy is lost due to energy being reflected back 22. Radio wave 10 now has less energy 26 as it passes onto contact point 14.

As contact point 14 is contacted, radio wave 26 loses energy and splits into radio wave 28 and radio wave 30, each with less energy than radio wave 26. Radio wave 30 propagates forward and contacts human body 2 front stomach wall 4, thereby losing energy due to a backward propagating radio wave 32. Radio wave 30 then passes back to imaging device 100 to be measured. The further radio wave 10 proceeds into human body 2, the weaker radio wave 10 becomes due to forward and backward propagation.

As radio wave 10 reflects off each additional contact point, contact point 14, 16, and 18, the energy reflected back will be measured by imaging device 100. Each measured component of reflected energy will become another variable in an over specified set of linear equations, thereby improving the estimate of the dielectric constant of each previous contact point. As in human body 2, as the reflected energy off four contact points is measured, each contact point will have four equations. The last equation will have four variables, three of which will already have been approximated.

To solve these equations the dielectric constant of air is substituted. Equations may be solved backward by substitution. Although there may be error, estimates may be made as to the dielectric constants of the material. Additionally, as radio wave 10 goes through contact point 18, the dielectric value of air can be substituted to improve the accuracy of the approximations.

Figure 8:
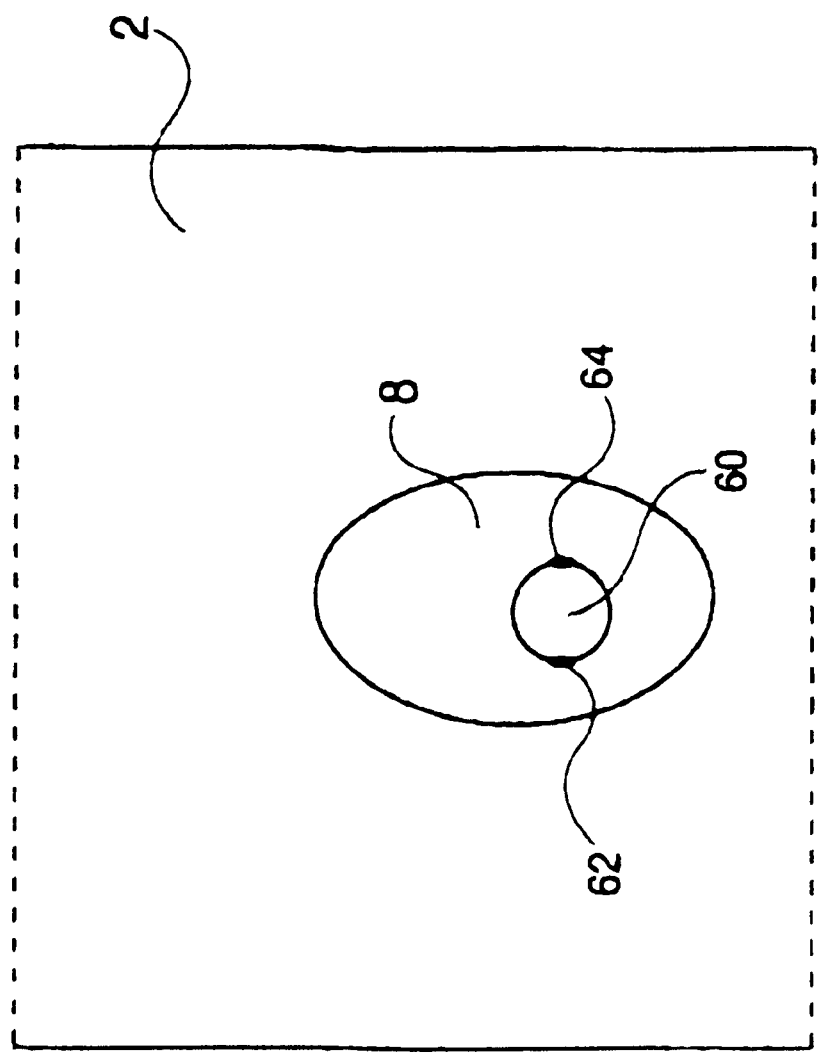
FIG. 8 is a diagram illustrating a human body containing an organ having a tumor.

FIG. 8 illustrates human body 2 containing organ 8 having tumor 60. For example, tumor 60 may have a different dielectric constant than organ 8. A reflection may be noticed off of tumor 60. Front side 62 and back side 64 of tumor 60 will both reflect, thereby showing up on imaging device 100 as a material within organ 8.

Figure 9:
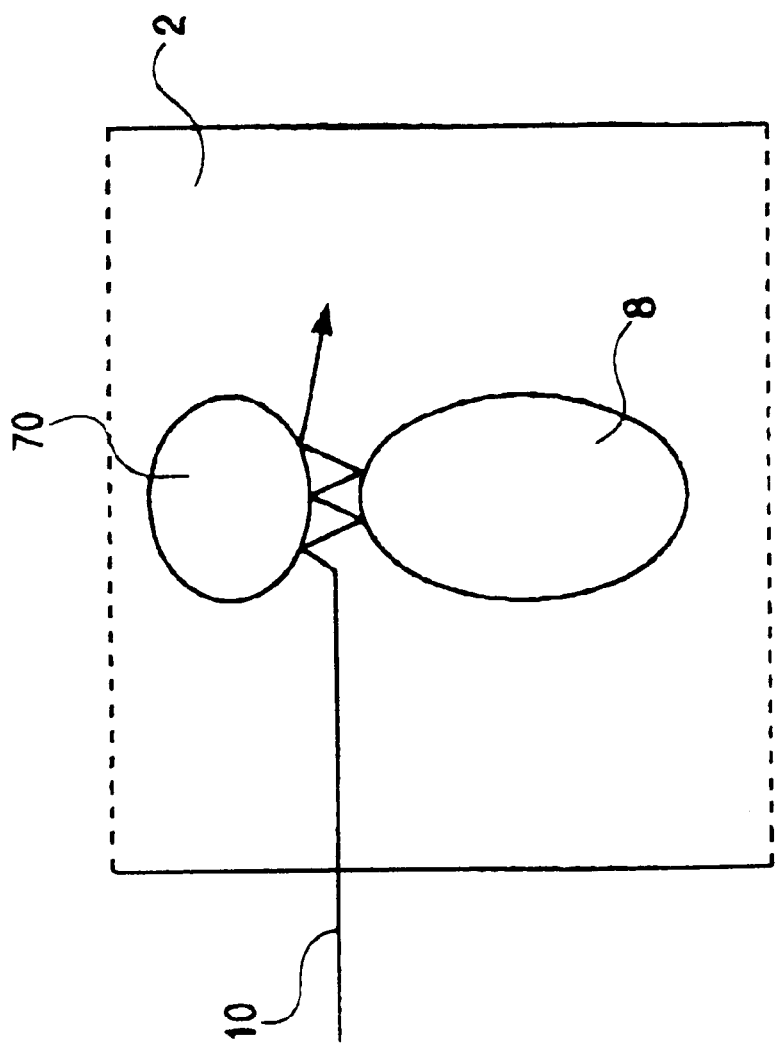
FIG. 9 is a diagram illustrating a radio wave passing within a human body with two organs.

FIG. 9 illustrates radio wave 10 passing within human body 2 with two organs, organ 8 and organ 70. Radio wave 10 passes between organ 8 and organ 70. Radio wave 10 bounces between organ 8 and organ 70, scattering energy. Little or no energy is reflected back to imaging device 100.

Due to a lack of energy being reflected, it may be postulated that there is an interface between organ 8 and organ 70. An interface such as the one between organ 8 and organ 70 would not be discovered with other technologies.

Imaging device 100 may not be able to image this particular region due to the lack of echo. However, a lack of echo may suddenly be of value. Portable imaging device 100 may then be moved around the object, human body 2, to create a stereo approach. By moving around the dead zone, an un-imageable region, eventually an image may be found containing information on objects within the dead zone. Unlike MRI's and other non-versatile imaging devices, imaging device 100 may image what most cannot. The speed at which radio wave 10 will proceed through human body 2 may be around 1000 sweeps per second.

Imaging device 100 creates three dimensional images, as opposed to traditional thermography which is a two dimensional technology. Infrared thermography is used for medical assessment and diagnosis. With thermography heat radiation from a patient, human body 2, is focused on a detector. Infrared thermography has replaced liquid crystal technology and microwave radiometry in areas such as oncology, orthopedics, neurology, and rheumatology. Changes in the vascularity of the skin caused by internal disorders may be detected.

A three dimensional imaging system is superior to two dimensional thermographic imaging. CAT scans which appear three dimensional are in reality two dimensional, with features extended to give the impression of three dimensions.

By determining dielectric constants of the material inside human body 2, each object may be labeled. By applying colors and/or textures to each dielectricly different object. A radio wave imaging system may be able to tell the objects apart, and will visually know which object is a tumor, a bowel, a liver, a bladder etc., by the color coding.

The process of labeling organs is possible by matching dielectric constants with a database containing values for body parts. Expert systems may be used to assist those who may not understand how to decipher the output of current imaging technologies.

The imaging device can selective highlight or remove the representations of different tissues or organs based on their dielectric constants. This would be useful in education and law enforcement. Virtual autopsies may be performed, virtually removing skin, then muscle, then bones and so on.

Figure 10:
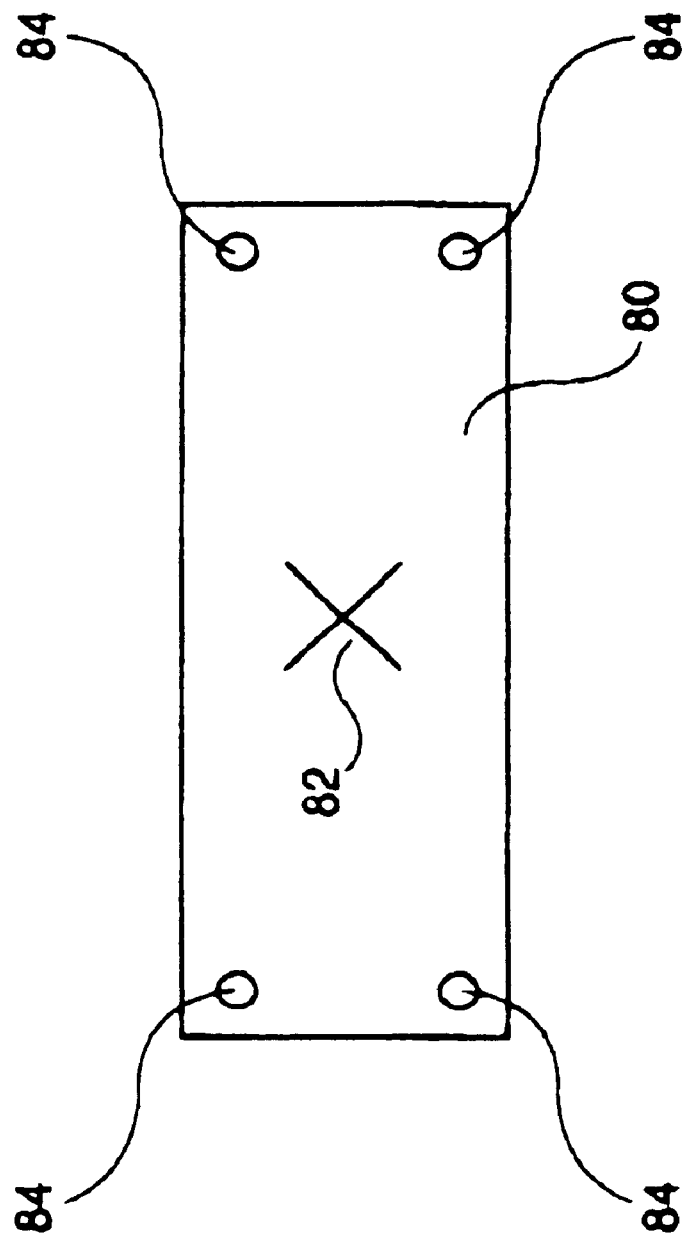
FIG. 10 is a diagram illustrating a radio wave imaging system containing a transmitter and four receivers.

FIG. 10 illustrates radio wave imaging system 80 containing transmitter 82 and four receivers 84. A pulse sent from transmitter 82 to every point on the surface being imaged will have a constant distance from transmitter 82 to each of four receivers 84. The constant distance is the distance the energy would have to travel for it to arrive at receivers 84. A collection of receivers 84 is needed to resolve an object in three dimensional space.

Figure 11:
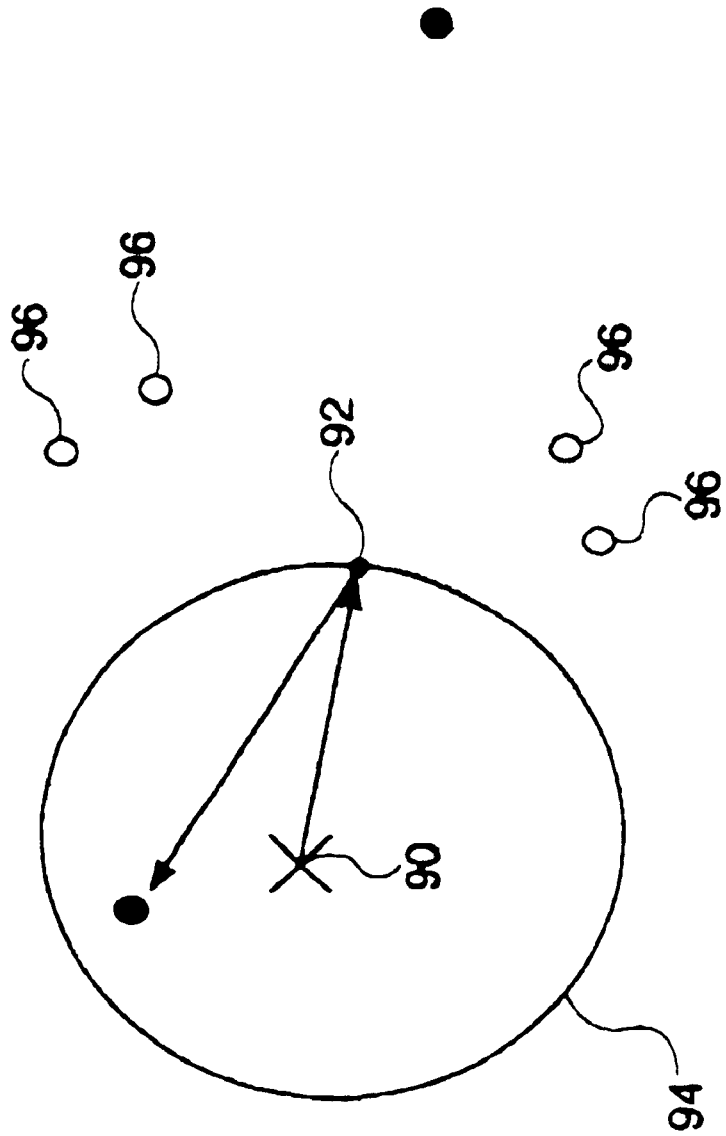
FIG. 11 is a diagram illustrating a transmitter sending a pulse which reflects off a point of contact of an object being imaged.

FIG. 11 illustrates transmitter 90 sending a pulse which reflects off of point of contact 92 of the object being imaged. Determining the distance that the pulse traveled will create ellipsoid 94. Multiple ellipsoids will allow objects to be resolved in three dimensional space. Additional objects 96 are shown.

Depending on the distance traveled by the pulse to various points of contact and on to transmitters, pulses will be received at various times.

Figure 12:
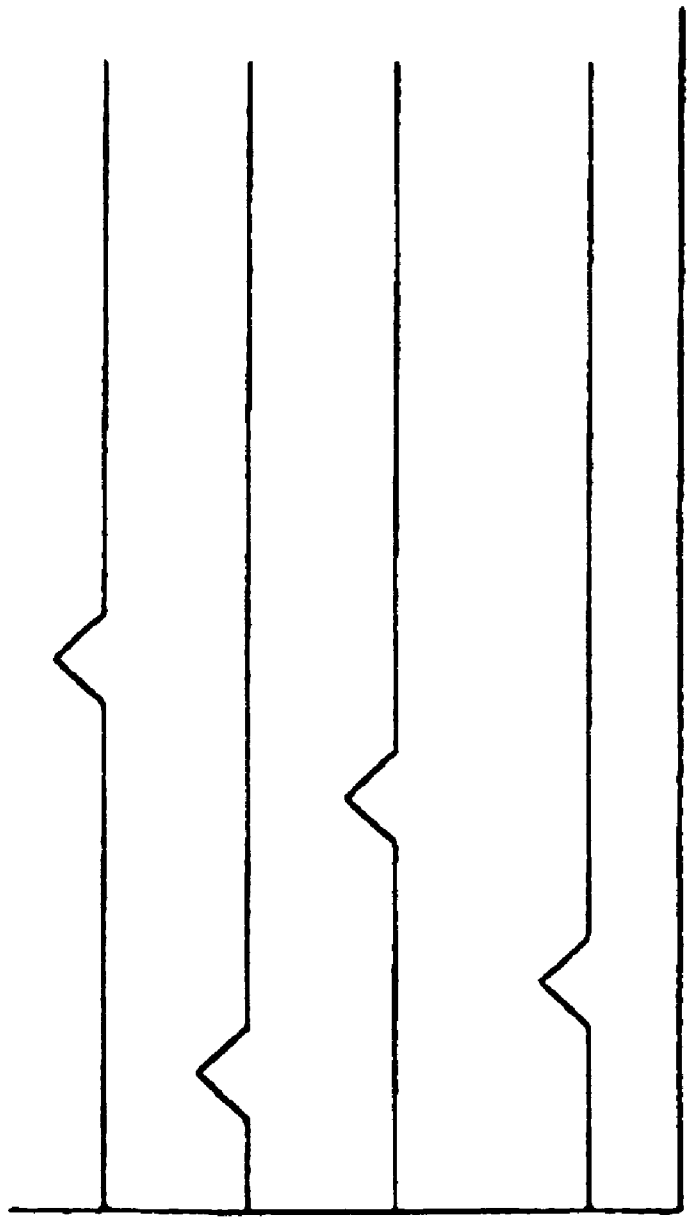
FIG. 12 is a diagram illustrating reception of pulses received by receivers located at varying distances from the points of contact.

FIG. 12 illustrates the reception of pulses received by receivers located at varying distances from the points of contact. The left most pulse was received before the right most pulse etc. What is received is the vector sum of the reflection of all surfaces and their dielectric constants.

Figure 13:
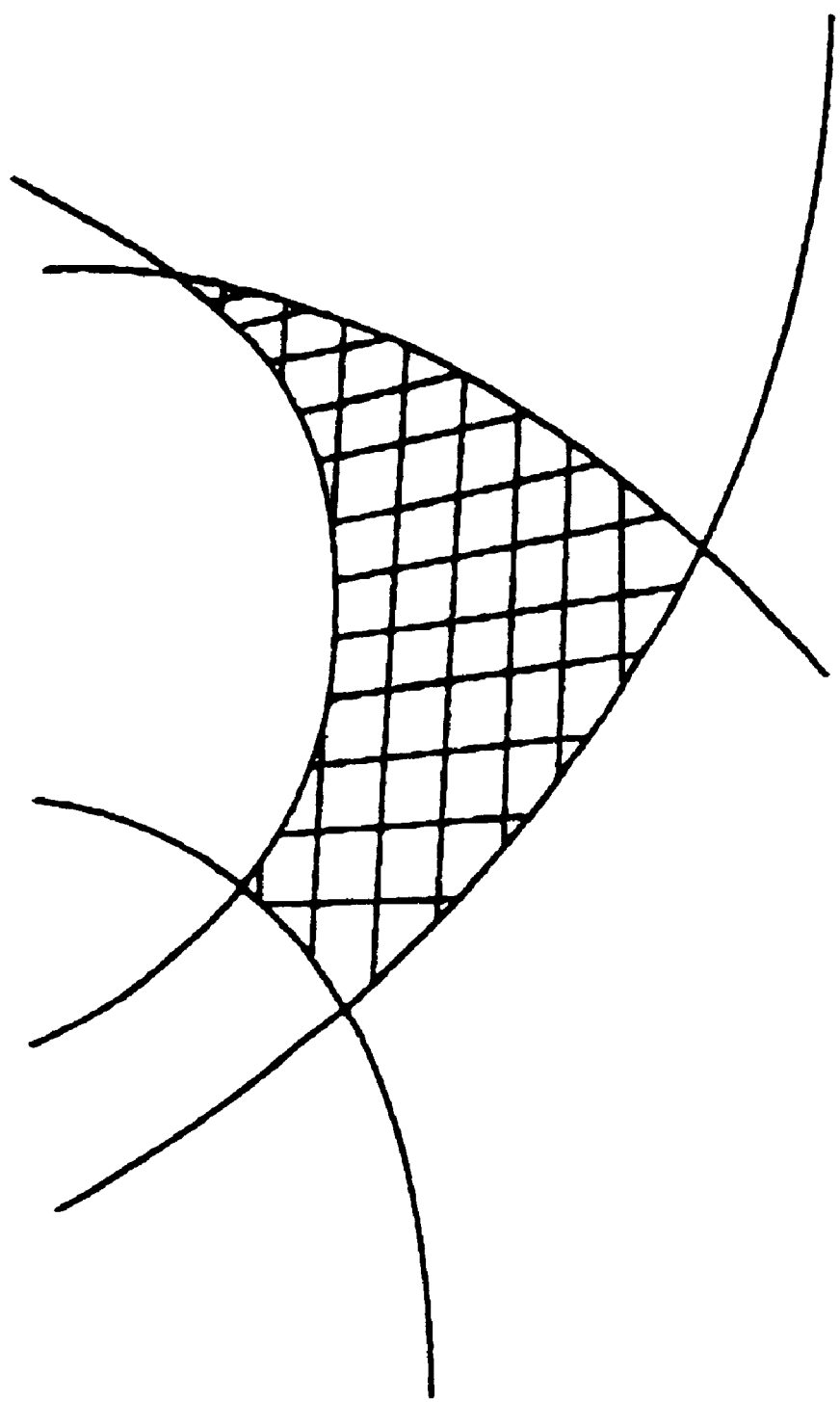
FIG. 13 illustrates the total amount of received energy from each object measured for distance as illustrated by cross-hatching of ellipsoids creating an area within the points of intersection.

Additional objects 96, shown in FIG. 11, create additional ellipsoids. The total amount of received energy from each object measured for distance creates a cross hatching, shown in FIG. 13, of ellipsoids creating an area within the points of intersection. An area within the points of intersection allows a three dimensional image to be created.

Figure 14:
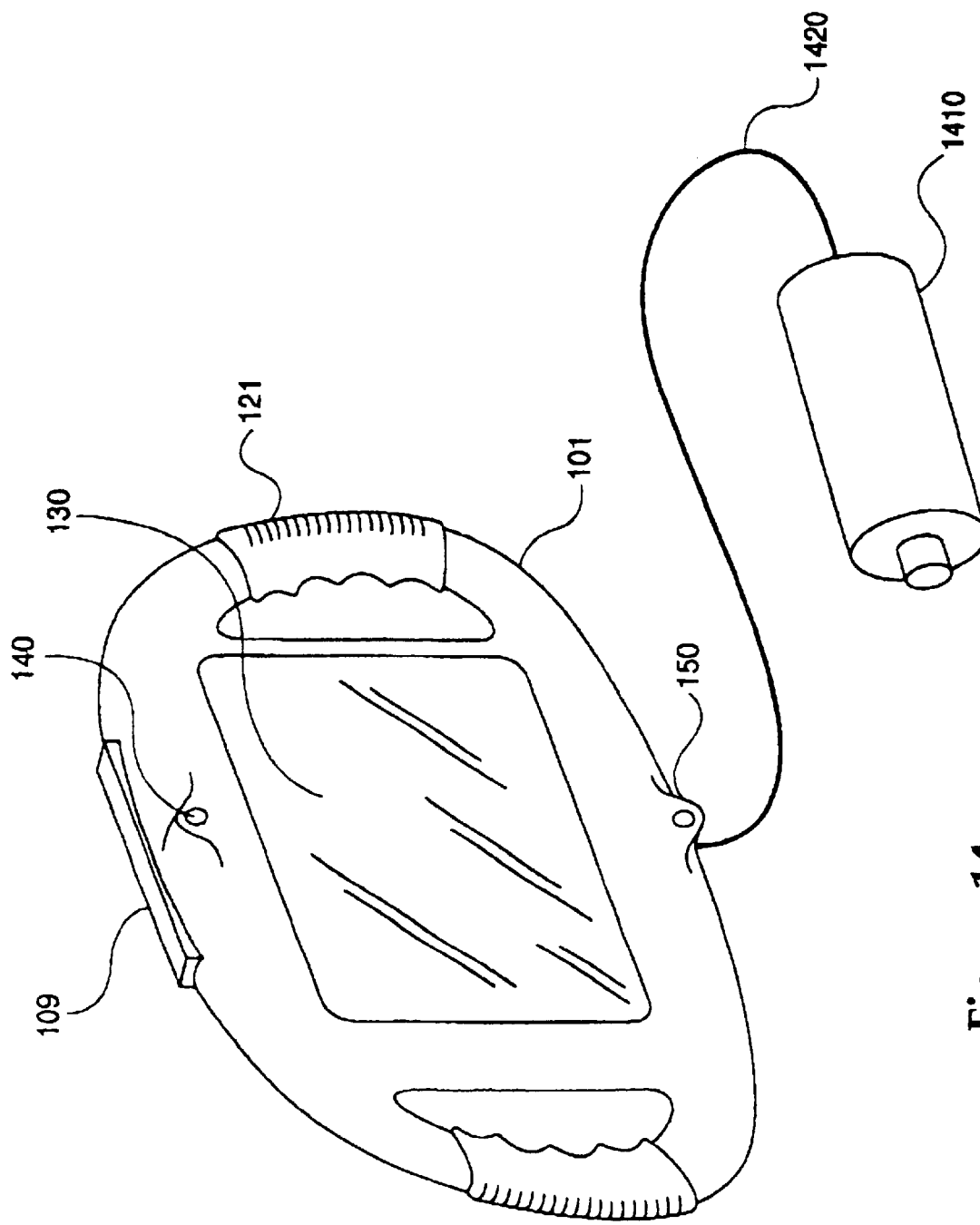
FIG. 14 is a view of a second embodiment of the present invention illustrating a portable multi-purpose imaging device with an attached laser.

FIG. 14 shows an additional embodiment of the present invention. Opening 150 could emit the beam from a built-in laser or a much stronger auxiliary laser or other similar device 1410. The emissions of auxiliary device 1410 may be transmitted in a wave cavity 1420. For example, fiber optic cable may be used to transmit a laser beam from a chemical or gas laser. Mirrors under microprocessor control at 150 can be used to direct the beam from the auxiliary laser or the on-board solid-state laser to a target. The imaging device could be used as a precise cutting tool.

Imaging device 100 applications for identifying objects based on their image characteristics are endless. A system may scan at airports for weapons, or any other designated object, in real time. A database of known images, such as guns, bullets, knives, etc., may be used containing known characteristics of each object. An expert system, also known as knowledge-based systems or simply knowledge systems, may perform pattern matching of scanned images to a database of images.

When performed in real time, security or other personnel, may be alerted immediately to suspicious objects within passengers luggage or on their person. An automated system, such as this, using imaging device 100 allows scanning of people or things in any place at any time, as opposed to current, bulky, and immovable scanning machines. Radar generated three dimensional images may be made from a distance so as to protect those performing the scans by making them less detectable.

A database may also be populated with a virtual finger print of individuals based on biometric data such as body and bone structure. Radar generated three dimensional images may be made from a distance and used for applications, such as security, identification of animals, art work by thickness of paint, burglars could be recorded by imaging device 100 and later matched when scanned by imaging device 100. A door may be operated using biometric data. This will allow for hands-free access. The door and lock will respond to the approach of a structure in its database and open the door.

Yet another application consists of using imaging device 100 along with an expert system to read sign language or the like. Individual hands, or more specifically their bone structure, would be scanned as they pass in the radar field. Hand signs may be recognized through pattern matching with an expert system. Signing may be used as input for a computer. Signing may also be translated into text, or speech for communicating with others. A portable imaging device 100 would allow a mute's signing to be translated to speech anywhere. The applications also go beyond the mute. Hand gestures can be used to issue commands to fly or drive-by-wire systems. Hand gestures and/or jaw/lip/vocal cord movements can also be translated into speech where silence is needed or in noisy environments. Team members can use hand gestures which can be translated into words and displayed on their viewer.

A virtual door lock may be created by using hand gestures to activate lock.

A drive-by-wire system may be used to operate a card using a virtual dash board. This would eliminate the impact hazard caused by the steering wheel of a car. Fly-by-wire systems may also use a virtual interface.

The interpretation of hand gestures may also allow for more effective remote robotic surgery. Voice-controlled surgical instruments are currently available from companies such as Computer Motion, Inc. headquartered in Santa Barbara, Calif. AESOP, HERMES, and ZEUS are some of their product names. By detecting the doctors hand motions in a sensor field which also has a virtual image of the patient, the doctor can remotely control the instruments to perform the operation.

Personal communication systems may be connected to imaging device 100 for connection to a remote database. Portability of imaging device 100 is increased through use of personal communication systems to tap into remote expert systems.

It should be noted that in the prior art, attempts to perform imaging device 100 functions have been made. However, lacking the parallel processing power of the processor array architecture, such devices have had to settle for limited non-real-time visual or audible displays, analog or optical solutions or require extensive time and/or search algorithms to generate usable images. Processor array architecture may allow processing on the order of 25 gigaflops, continually producing such images in real time, rather than producing a single frame after many seconds or minutes of processing.

While various embodiments and applications of this invention have been shown and described, it will be apparent to those skilled in the art that modifications are possible without departing from the inventive concepts described herein. The invention, therefore, is not to be restricted except in the spirit of the appended claims.

We claim:

1. A compact imaging device comprising:
a portable case;
an array of sensors mounted on the portable case, for scanning an area and for receiving return signals;
one or a plurality of processors, coupled to array of sensors, for receiving return signals from the array of sensors, processing the return signals, and producing image data corresponding to the return signals; and
a display, coupled to the one or plurality of processors, mounted in the portable case for receiving the image data and generating an image corresponding to the return signals.

2. The device of claim 1, further comprising:
a slot in the portable case for receiving a program cartridge containing instructional programming to control how the plurality of processors process the return signals to produce image data.

3. The device of claim 1 wherein said plurality of processors are in a parallel architecture.

4. The device of claim 1, wherein one or more of the sensors in said array of sensors are sensitive to different parts of the electromagnetic spectrum, for generating different spectrum image data of the area scanned by the sensors; and
wherein said one or plurality of processors combine image data corresponding to the return signals with different spectrum image data generated by said one or more of the sensors in said array of sensors to generate fused image data.

5. The device of claim 1, wherein said one or a plurality of processors store image data in a memory from a number of regular successive scans and generate a three-dimensional model of the area scanned by the radar sensors, the number of regular successive scans made at a rate substantially greater than the rate of movement of the portable case, said one or a plurality of processors generate position data of the portable case by comparing image data from successive scans.

6. A method of generating a image in real-time in a compact imaging device comprising the steps of:
scanning an area with radar from an array of radar sensors mounted on a portable case and receiving return signals;
processing the return signals in one or a plurality of processors formed as an integrated circuit and provided within the portable case, the one or plurality of processors being coupled to the array of radar sensors, and producing image data corresponding to the return signals as a result of the processing, and
generating an image, from the image data, corresponding to the return signals on a display mounted in the portable case and coupled to the processors.

7. The method of claim 6, further comprising the step of storing multiple images for retrieval at a later time.

8. The method of claim 6, further comprising the steps of:

searching a database containing image patterns, and determining a match between patterns of the generated images and patterns of images stored in a database.

9. The method of claim 6, further comprising the steps of:

utilizing a knowledge based system consisting of a set of rules and related data;

analyzing generated images using the rules and data within the knowledge base system, and outputting a conclusion after analysis.

10. The method of claim 9, wherein the knowledge based system consists of rules and data specific to the medical field and the output conclusion is a medical diagnosis.

11. The method of claim 9, wherein the knowledge based system consists of rules and data specific to hand-gesture based language and the output conclusion is the conversion of hand-gesture based language to computer commands, text or speech.

12. The method of claim 9, wherein the knowledge based system consists of rules and data specific to determining materials and the output conclusion is the type of material scanned.

13. The method of claim 9, wherein the knowledge based system consists of rules and data specific to security and the output conclusion is the type of security risk detected.

14. The method of claim 9, further comprising the steps of:

coding each object visually with a color corresponding to the outputted conclusion to differentiate the objects within each image, and displaying each color coded object.

15. The method of claim 9, further comprising the steps of:

coding each object visually with a texture map corresponding to the outputted conclusion to differentiate the objects within each image, and displaying each texture coded object.

16. The method of claim 6, further comprising the steps of:

loading, from a program cartridge received in a slot in the portable case, instructional programming for controlling how the one or a plurality of processors process the return signals to produce image data.

17. The method of claim 6, further comprising the steps of:

generating, in a digital video camera mounted on the portable case, image data of the area scanned by the radar sensors, and combining, in the one or a plurality of processors, image data corresponding to the return signals with the image data generated by the digital video camera to generate fused image data.

18. The method of claim 6, further comprising the steps of:

generating, in a one or a plurality of sensors sensitive to different parts of the electromagnetic spectrum mounted on the portable case, spectrum image data of the area scanned by the sensors; and combining in the one or a plurality of processors, image data corresponding to the return signals with the spectrum image data generated by the one or a plurality of sensors to generate fused image data.

19. The method of claim 6, further comprising the steps of:

generating a number of regular successive scans of data, the number of regular successive scans made at a rate substantially greater than the rate of movement of the portable case, storing, from the one or a plurality of processors, image data in a memory from the number of regular successive scans, generating, from the one or a plurality of processors, position data of the portable case by comparing image data from successive scans, and generating, from the one or a plurality of processors using the image data from the number of regular successive scans and the position data of the portable case, a three-dimensional model of the area scanned by the one or plurality of sensors.

20. The method of claim 19, further comprising the step of storing the image data associated with the scanned object for later retrieval and generation of a three-dimensional model.

21. A method of determining a scanned objects material comprising the steps of:

scanning an area with one or more of a plurality of sensors and receiving return signals;

measuring the energy of returned signals;

calculating a constant based on the measured energy, and determining the scanned objects material through matching the calculated constant with constants in a database.

22. The method of claim 21, wherein calculating a constant comprises utilizing returned energy to create a dielectric constant by squaring the difference in the impedance divided by the sums of the impedance and multiplied by the measured return energy.

23. The method of claim 21, further comprising the steps of:

searching a database containing known dielectric constants;

determining a match between the calculated dielectric constant and the database of known constants, and returning the result from the match.

24. Electro-optical eyewear comprising:

a frame;

a one or a plurality of sensors sensitive to different parts of the electo-magnetic spectrum which are mounted on the frame, for scanning an area and for receiving return signals;

one or a plurality of processors, coupled to the a one or a plurality of sensors sensitive to different parts of the electo-magnetic spectrum, for receiving return signals from the one or a plurality of sensors sensitive to different parts of the electo-magnetic spectrum, processing the return signals, and producing image data corresponding to the return signals;

a first display unit, coupled to the one or a plurality of processors, mounted in the frame for receiving the image data and generating an image corresponding to the return signals for display to user's left eye; and a second display unit, coupled to the one or a plurality of processors, mounted in the frame for receiving the image data and generating an image corresponding to the return signals for display to user's right eye.

25. The device of claim 24, wherein said plurality of processors are of a parallel architecture.

26. The device of claim 25, wherein the first and second display units are liquid crystal displays.

27. The device of claim 25, wherein the first and second display units are virtual retinal displays.

28. The device of claim 25, wherein the first and second display units are holographic displays.

29. The device of claim 24 or 25, wherein one or more of the sensors include a further comprises a per-pixel gain control system to selective shutter pixels so that areas of different reflected energy can be eliminated or enhanced.

30. The device of claim 24 or 25, wherein the first and second display units are liquid crystal displays.

31. The device of claim 24 or 25, wherein the first and second display units are virtual retinal displays.

32. The device of claim 4 or 5, wherein the first and second display units are holographic displays.

* * * * *